United States Patent [19]

Shukushima et al.

[11] Patent Number: 5,405,665
[45] Date of Patent: Apr. 11, 1995

[54] MULTI-LAYERED FOAM HEAT-SHRINKABLE TUBE

[75] Inventors: Satoshi Shukushima; Tomoyoshi Kishimoto, both of Osaka, Japan

[73] Assignee: Sumitomo Electric Industries, Ltd., Osaka, Japan

[21] Appl. No.: 903,973

[22] Filed: Jun. 26, 1992

[30] Foreign Application Priority Data

Jun. 28, 1991 [JP]  Japan .................. 3-185723

[51] Int. Cl.⁶ .............. B23B 7/12; B65B 53/00; B29D 22/00
[52] U.S. Cl. .................. 428/34.9; 428/36.5; 428/317.3; 428/319.7; 428/319.9; 428/343; 428/344; 428/354; 428/356
[58] Field of Search .............. 428/36.1, 36.2, 343, 428/344, 354, 356, 34.9, 36.5, 317.3, 319.7, 319.9

[56] References Cited

U.S. PATENT DOCUMENTS

| | | | |
|---|---|---|---|
| 4,033,929 | 1/1974 | Stiles et al. | 264/54 |
| 4,168,192 | 9/1979 | Nyberg | 156/86 |
| 4,181,775 | 1/1980 | Corke | 428/34.9 |
| 4,450,871 | 5/1984 | Sato et al. | 428/34.9 |
| 4,608,284 | 8/1986 | Roales | 428/346 |
| 4,707,388 | 11/1987 | Park et al. | 428/346 |
| 4,966,805 | 10/1990 | Ezawa et al. | 428/319.7 |

FOREIGN PATENT DOCUMENTS

| | | |
|---|---|---|
| 53-66986 | 6/1978 | Japan . |
| 58-3819 | 1/1983 | Japan . |
| 59-34195 | 3/1984 | Japan . |
| 60-183120 | 9/1985 | Japan . |
| 1367144 | 9/1974 | United Kingdom . |
| 2186213 | 2/1986 | United Kingdom . |
| 2167319 | 5/1986 | United Kingdom ............. 428/34.9 |
| 9208073 | 5/1992 | WIPO ............................. 428/34.9 |

Primary Examiner—George F. Lesmes
Assistant Examiner—Kathryne E. Shelborne
Attorney, Agent, or Firm—Cushman Darby & Cushman

[57] ABSTRACT

The invention relates to a multi-layer foam heat-shrinkable tube comprising a hot-melt adhesive layer as the innermost layer, at least one non-foam layer and at least one foam layer provided on an outside surface of the hot-melt adhesive layer. The invention also relates to a method for producing a multi-layer foam heat-shrinkable tube comprising extruding a hot-melt adhesive layer as the inner most layer, at least one non-foam layer, and at least one foam layer to form a multi-layer foam tube, heating and expanding the inner diameter of the multi-layer foam tube, and cooling the expanded multi-layer tube while an inner diameter of the tube at the expanded state is maintained. The non-foam layers and foam layers can be provided in any number and any order. The multi-layered foam heat-shrinkable tube easily adheres to and covers the surface of an article such as a metal pipe, a metal rod, or the like, and provides good heat and electrical insulation, corrosion resistance, water-resistance, and so on, to thereby protect the article. The tensile strength of the multi-layer foam heat-shrinkable tube is not lessened even if the foaming ratio of a foam layer is made high.

2 Claims, 1 Drawing Sheet

MULTI-LAYERED FOAM HEAT-SHRINKABLE TUBE

BACKGROUND OF THE INVENTION

1. Field of the Invention

The present invention relates to a multilayered foam heat-shrinkable tube which easily adheres to and covers the surface of an article such as a metal pipe, a metal rod, or the like, and which provides good heat and electrical insulation, corrosion resistance, water resistance, and so on, to thereby protect the article. The invention also relates to a method for producing the multi-layer foam heat-shrinkable tube.

2. Description of the Related Art

A macromolecule foam material has been used for coating a surface of various articles such as pipes, rods, and the like, which provides heat and electrical insulation, corrosion resistance, water resistance, cushion, and the like.

One conventional method of coating the surface of an article with the macromolecule foam material is to extrude the macromolecule directly onto the outer surface of an article. Another conventional method is to form a foam pipe having an inner diameter equal to an outer diameter of a metal pipe and thereafter to insert the metal pipe into the foam pipe. However, in this method, it is necessary to form foam pipes having different inner diameters corresponding to metal pipes having different outer diameters. Further, it is impossible to insert a metal pipe having an outer diameter veried in the middle of the pipe into a foam pipe. Thus, this method is troublesome and unreasonable.

Japanese Patent Publication No. Sho-58-3819 discloses a foam heat-shrinkable tube obtained by extrusion-molding a thermoplastic polymer containing a foam agent. An extrusion-molded foam tube is softened by heat and the inner diameter is expanded. Then, the tube is cooled while the inner diameter at the expanded state is maintained, so that the foam heat-shrinkable tube is formed. After being applied onto an article, such as a metal pipe or the like, so as to cover it, the tube is heated which allows the tube to shrink to the inner diameter at the extruded state and to foam. However, foaming of the tube decreases the adhesion between the tube and the article because the inner diameter of the tube increases by the foaming so that a gap is generated between the tube and the article. Further, heating the tube by a heat gun or the like may cause uneven foaming of the tube.

Japanese Utility Model Unexamined Publication No. Sho-59-34195 discloses a heat-shrinkable tube having an inner surface on which a heat-insulating material such as a macromolecule foam body or the like is provided. However, since the heat-insulating material has no heat shrinking properties, the adhesion between the heat-insulating material and the surface of the article is unsatisfactory.

If the adhesion between the foam layer and the surface of the article is unsatisfactory, water, such as rain water or the like, enters between the foam layer and the article to thereby corrode the article.

A foam heat-shrinkable tube made of a thermoplastic polymer that has finished foaming can be made by heating and expanding the inner diameter of the tube. When the tube is applied onto an article, such as a metal pipe or the like, and then heated to shrink, good adhesion between the tube and the article can be formed.

However, if the foaming ratio, which is defined as a ratio of specific gravity of a resin before foaming to that of the resin after foaming, of the foam layer is made high to improve its heat-insulating capacity, its density is so low that its mechanical strength, such as tensile strength or the like, is insufficient. If the foaming ratio is made low to increase the mechanical strength, the heat insulating capacity or the like, which is an original characteristic of the foam tube, is insufficient.

Further, to attain high corrosion resistance, the adhesion between the tube and the surface of an article must be improved.

SUMMARY OF THE INVENTION

An object of the present invention is to provide a multi-layered foam heat-shrinkable tube (hereinafter MLFHS tube) which has a mechanical strength, such as tensile strength and the like, that does not decrease even if the foaming ratio of a foam layer is made high.

Another object of the present invention is to provide a MLFHS tube which has sufficient adhesion to the surface of an article to provide good corrosion resistance.

It is a further object of the present invention to provide a method for making the MLFHS tube.

The above objectives are obtained by combining at least one foam layer, at least one non-foam layer, and a hot-melt adhesive layer as the innermost layer. The non-foam layer provides strength and the foam layer provides heat insulation. When the MLFHS tube is applied onto an article to cover it and then heated to shrink the MLFHS tube, the hot-melt adhesive layer melts on the surface of the article to make the MLFHS tube adhere to the surface to the article, so that the adhesion is sufficient to provide good corrosion resistance.

The MLFHS tube is made by extruding a hot-melt adhesive layer as the inner most layer, at least one non-foam layer, and at least one foam layer to form a multi-layer foam tube, heating and expanding the inner diameter of the multi-layer foam tube, and cooling the expanded multi-layer tube while the inner diameter of the tube at the expanded state is maintained.

DETAILED DESCRIPTION OF THE PREFERRED EMBODIMENTS

Figure 1:
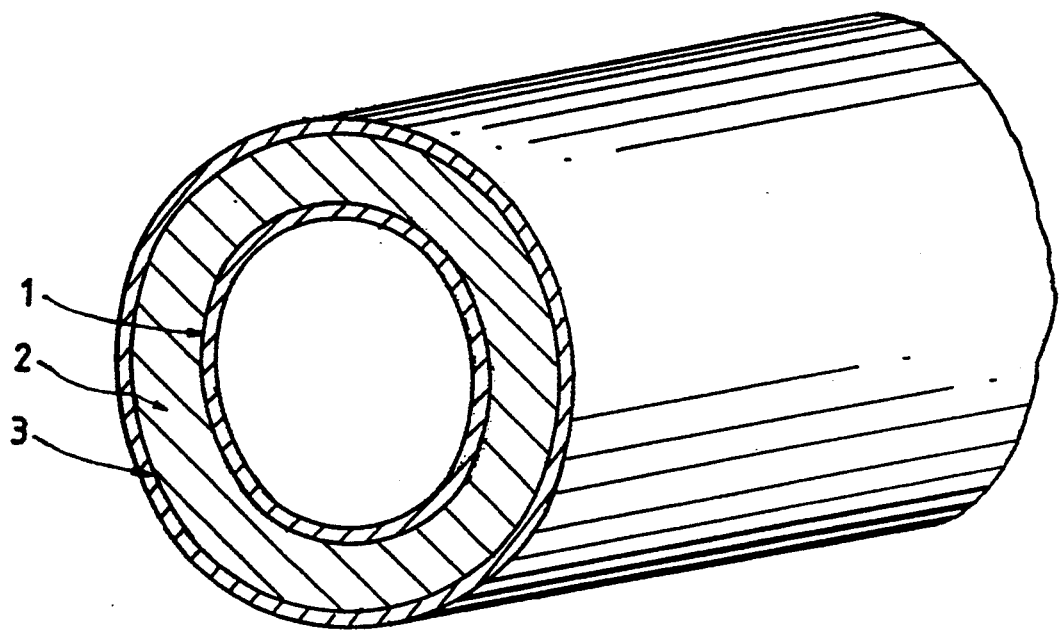
FIG. 1 is an external view showing a section of an embodiment of the MLFHS tube.

The MLFHS tube comprises at least one non-foam layer, at least one foam layer and a hot-melt adhesive layer as the innermost layer. The non-foam and foam layers can be provided in any order and in any number.

The hot-melt adhesive layer melts on the surface of an article, such as a metal pipe or the like, when the MLFHS tube is heat-shrunk. The melting of the hot-melt adhesive provides good adhesion and prevents foreign substances such as water from entering between the MLFHS tube and the covered article.

The UL standard (Standard of Underwriter's Laboratories, Inc. of U.S.) requires a tensile strength of not less than 1.05 kg/mm$^2$ for an olefin heat-shrinkable tube. In a conventional foam heat-shrinkable tube, the higher the foaming ratio of the foam layer, the lower the density of the polymer. A heat-shrinkable tube with a low density of polymer does not have sufficient tensile strength to comply with the UL standard.

The non-foam layer provides sufficient strength to the MLFHS tube to comply with the UL standard.

A thermoplastic polymer may be used as a base polymer of the foam layer and the non-foam layer. The respective base polymers for forming the foam layer and the non-foam layer do not have to be the same.

Examples of methods of manufacturing the MLFHS tube include: a method in which a foam layer, a non-foam layer, and a hot-melt adhesive-agent layer are simultaneously extruded by a multilayer extruder; a method in which a foam layer and a hot-melt adhesive-agent layer are simultaneously extruded, and then a non-foam layer is extruded over the first extruded layers; a method in which a non-foam layer and a hot-melt adhesive-agent layer are simultaneously extruded, and then a foam layer is extruded over the first extruded layers; and so on. To reduce the number of manufacturing steps, the method in which all the layers are simultaneously extruded is preferred.

The inner diameter of the thus obtained MLFHS tube is expanded. Expanding the diameter is generally performed under heating by providing air pressure to the inside of the MLFHS tube, by applying a vacuum to the outside of the MLFHS tube, or by combining the two.

After the MLFHS tube has been expanded to have a predetermined inner diameter, the MLFHS tube is cooled while the inner diameter at the expanded state is maintained. When heated again, the MLFHS tube shrinks to its original inner diameter.

Examples of a thermoplastic polymer to be used for the base polymer of the foam layer and the non-foam layer include: an olefin polymer such as polyethylene, an ethylene-vinylacetate copolymer, an ethylene-acrylate copolymer, an ethylene-α olefin copolymer, a polypropylene, etc.; thermoplastic resin such as polystyrene, polyvinyl chloride, etc.; elastomer such as nitrile rubber, isobutylene-isoprene rubber, acrylonitrile-butadiene-styrene rubber, olefin elastomer, styrene elastomer, urethane elastomer, polyester elastomer, etc.; a mixture of two or more materials mentioned above; and so on.

Examples of a foam agent to be mixed with the thermoplastic polymer of the foam layer include: an azo compound such as azodicarbonamide, azobisisobutylonitrile, etc.; a nitroso compound such as dinitrosopentamethylene-tetramine, etc.; a sulfonylhydrazide compound such as para-toluenesulfonyl hydrazide, 4,4'-oxybisbenzene sulfonylhydrazide, etc.; and so on.

The quantity of the foam agent is not specifically limited but is generally about 0.5–25 parts by weight, preferably 1–20 parts by weight, relative to 100 parts by weight of the thermoplastic polymer. The foaming ratio is adjusted by varying the quantity of the foam agent.

To efficiently perform foaming and if necessary, a foam auxiliary agent such as an urea compound, zinc white, tribasic sulfate, zinc stearate, lead stearate, or the like, may be used with the foam agent.

The foaming ratio of the foam layer is generally about 1.1–20. It is preferable that the foaming ratio be not less than 1.5 in order to obtain sufficient heat-insulation.

The following materials may be added to the foam layer and the non-foam layer if necessary: filler such as talc, clay, silica, alumina, or the like; a flame retardant such as deca-bromodiphenylether, antimony trioxide, magnesium carbonate, aluminum hydroxide, zinc borate, or the like; or an antioxidant from the group of phenols or of amines.

Cross-linking may be employed by any method including: irradiation with ionizing radiation such as electron beams, gamma rays, or the like; and by adding a cross-linking agent.

The quantity of irradiation is not specifically limited but is preferably from 0.5 to 30 Mrad.

Examples of the cross-linking agent include: a peroxide such as a dicumyl peroxide, a lauryl peroxide, a benzoyl per oxide, a methylethyl ketone peroxide, etc.; a thiuram compound such as a tetramethylthiuram disulfide, a tetramethylthiuram monosulfide, etc.; a dithiocarbanate compound such as a zinc methyldithiocarbanate, a dithiocarbamate, etc.; and so on. Generally, the cross-liking agent is used in the ratio of about 0.2–4 parts by weight relative to 100 parts by weight of the thermoplastic polymer.

The cross-liking treatment may be performed using a method in which a MLFHS tube is formed by extrusion, and then the MLFHS tube is subjected to irradiation cross-linking treatment or chemical cross-liking treatment so as to have a viscoelasticity necessary for foam. After cross-linking, the MLFHS tube is heated to form the foam layer. Cross-linking may be performed after the foam layer is formed simultaneously with extrusion.

The hot-melt adhesive agent must bond to the surface of an article at the same time the MLFHS tube is heat-shrunk. Therefore, the hot-melt adhesive agent must have a softening point lower than the shrinkage temperature. Examples of a hot-melt adhesive agent include: a copolymer of ethylene and vinyl-acetate (EVA), a copolymer of ethylene and ethyl-acrylate (EEA), ionomer resin, polyamide resin, and so on.

The proportion of thickness of the respective layers of the MLFHS tube may be suitably selected in accordance with the purpose of use. It is preferable that the proportion of the thickness of the foam layer/the non-foam layer/the hot-melt adhesive layer be about 50–80/10–40/5–15.

EXAMPLES

Although examples of the invention and comparative examples will be specifically used for the description of the present invention hereunder, the present invention is not limited only to these examples.

Example 1

100 parts by weight of polyethylene (MI:1.4) and 3 parts by weight of foam agent (Tradename CELLMIC CAP-500, produced by Sankyo Chemical-Industry Co. Ltd.) from the group of azodicarbonamides were kneaded together using a mixing roll and then formed into pellets using a pelletizer to thereby prepare a foam layer material. EVA (MI: 150, vinyl acetate content: 25 parts by weight) was used as the hot-melt adhesive layer material.

Using these materials, a foam tube having an adhesive agent was produced through simultaneous extrusion using a two-layer extruder so that the foam tube had an inner diameter of 5 mm, a hot-melt adhesive layer (the innermost layer) thickness of 0.2 mm, and a foam-layer thickness of 1.2 mm. The foam layer was extruded at 140° C. The foaming ratio of the foam layer was 2.

Polyethylene (MI:1.4) containing no foam agent was extruded onto the outside of the foam tube to a thickness of 0.5 mm, thereby forming the outermost layer. 10 Mrad irradiation was applied to the multi-layer tube using an electron accelerator so that polyethylene was cross-linked. Next, while the tube was being passed through a furnace heated to 150° C., air was pumped into the tube so as to apply pressure from the inside in the radial direction of the tube enlarging the inner diameter of the tube to 10 mm. The tube was allowed to cool from 150° C. to a room temperature while the inner diameter of the tube is maintained to be 10 mm. Accordingly, as shown in FIG. 1, obtained was a MLFHS tube having a three-layer structure: a hot-melt adhesive layer (1), a foam layer (2) and a non-foam layer (3).

The fracture tensile force of the obtained MLFHS tube was measured by the method of ASTM D412 to be 1.2 kg/mm$^2$, which complies with the UL standard.

Further, the MLFHS tube was inserted onto an aluminum pipe having an outer diameter of 8 mm and heated to about 150° C. for about 5 minutes to shrink and adhere the MLFHS tube to the aluminum pipe.

The thus prepared MLFHS tube and aluminum pipe were submerged in water at a room temperature for 24 hours. The MLFHS tube was then cut and examined. No water was found between the MLFHS tube and the aluminum pipe.

Example 2

100 parts by weight of polyethylene (MI: 1.4) and 3 parts by weight of foam agent (Tradename CELLMIC CAP-500, produced by Sankyo Chemical Industry Co. Ltd.) from the group of azodicarbonamides were kneaded together using a mixing roll and then formed into pellets using a pelletizer to thereby prepare a foam layer material. Polyethylene (MI:14) containing no foam agent was used as a non-foam layer material. EVA (MI:150, vinyl acetate content: 25 parts by weight) was used as the hot-melt adhesive layer material.

Using these materials, a foam tube was produced through simultaneous extrusion using a three-layer extruder so that the foam tube had an inner diameter of 5 mm, a hot-melt adhesive-agent layer (the innermost layer) thickness of 0.2 mm, a non-foam layer (intermediate layer) thickness of 0.5 mm, and a foam-layer (outer layer) thickness of 1.2 mm. The foam layer was extruded at 140° C. The foaming ratio of the foam layer was 2 times.

Figure 2:
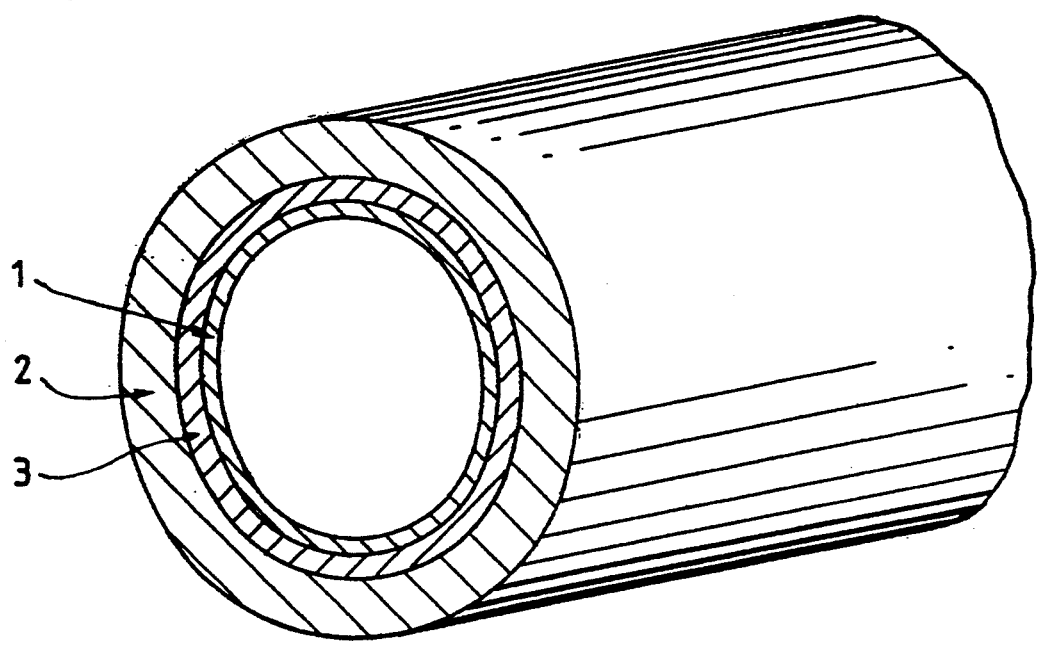
FIG. 2 is an external view showing a section of another embodiment of the MLFHS tube.

The foam tube was cross-linked and enlarged as in example 1. Accordingly, as shown in FIG. 2, obtained was a MLFHS tube having an inner-diameter of 10 mm and three layers: a hot-melt adhesive layer (1), a non-foam layer (2) and a foam layer (3).

The fracture tensile force of the thus obtained MLFHS tube was measured by the method of ASTM D412 to be 1.5 kg/mm$^2$, which complies with the UL standard.

Example 3

100 parts by weight of EVA (MI: 1.5, vinyl acetate content: 10 weight %) and 4 parts by weight of sulfonylhydrazide foam agent (Tradename CELL-MIC S, produced by Sankyo Chemical Industry Co. Ltd.) were kneaded together using a mixing roll, and then formed into pellets using a pelletizer to prepare a foam layer material. Polyamide having a softening point of 110° C. was used as the hot-melt adhesive material.

Using these materials, a foam tube was produced through simultaneous extrusion using a two-layer extruder so that the foam tube had an inner diameter of 10 mm, a hot-melt adhesive layer (the innermost layer) thickness of 0.3 mm, and a foam-layer thickness of 1.6 mm. The foam layer was extruded at 140° C. The foaming ratio of the foam layer was 3.

EVA (MI: 1.5, vinyl acetate content: 10 weight %) containing no foam agent was extruded onto the outside of the foam tube to a thickness of 0.8 mm.

The foam tube was cross-linked and enlarged as in example 1 to obtain a MLFHS tube having an innerdiameter of 20 mm.

The fracture tensile force of the thus obtained MLFHS tube was measured by the method of example 1 to be 1.4 kg/mm$^2$ which complies with the UL standard.

According to the present invention, the MLFHS tube is provided with a non-foam layer in contact with a foam layer so that even if the foaming ratio of the foam layer is large it is possible to obtain a fracture tensile force which complies with the UL standard. Further, the foam layer, which has completed foaming, is heat-shrinkable so that the heat shrinkage of the MLFHS tube is performed evenly resulting in good adhesion between the MLFHS tube and the surface of the covered article.

A hot-melt adhesive layer is provided as the innermost layer, so that the hot-melt adhesive layer adheres to the surface of an article at the time of performing heat-shrinkage to thereby improve adhesion, waterproofing and resistance to corrosion.

While the invention has been described in detail and with reference to specific embodiments thereof, it is apparent to one skilled in the art that various changes and modifications can be made therein without departing from the spirit and scope thereof.

We claim:

1. A multi-layer foam heat-shrinkable tube comprising:
   a hot-melt innermost adhesive layer selected from the group consisting of a copolymer of ethylene and vinyl-acetate, a copolymer of ethylene and ethylacrylate, an ionomer resin, and a polyamide resin; and
   at least one non-foam layer having a tensile strength not less than 1.05 kg/mm$^2$ and at least one foam layer provided on an outside surface of said hot-melt adhesive layer, wherein said hot-melt innermost adhesive layer has a softening point lower than a shrinkage temperature of said multi-layer foam heat-shrinkable tube, and wherein said at least one-non foam layer and said at least one foam layer are selected from the group consisting of an olefin polymer, an ethylene-vinylacetate copolymer, an ethylene-acrylate copolymer, an ethylene-α olefin copolymer, a polypropylene, a thermoplastic resin, and an elastomer.

2. A multi-layer foam heat-shrinkable tube comprising:
   a hot-melt innermost adhesive layer selected from the group consisting of a copolymer of ethylene and vinyl-acetate, a copolymer of ethylene and ethylacrylate, an ionomer resin, and a polyamide resin; and
   at least one non-foam layer having a tensile strength not less than 1.05 kg/mm$^2$ and at least one foam layer provided on an outside surface of said hot-melt adhesive layer, wherein said hot-melt innermost adhesive layer has a softening point lower than a shrinkage temperature of said multi-layer foam heat-shrinkable tube, and wherein said at least one-non foam layer and said at least one foam layer are selected from the group consisting of polyethylene and a copolymer of ethylene and vinyl-acetate.

* * * * *